United States Patent
Miyamoto et al.

(10) Patent No.: US 6,602,859 B2
(45) Date of Patent: Aug. 5, 2003

(54) PHOTOCURABLE HYALURONIC ACID DERIVATIVE AND PROCESS FOR PRODUCING THE SAME, AND PHOTOCURED CROSSLINKED-HYALURONIC ACID DERIVATIVE AND MEDICAL MATERIAL USING THE SAME

(75) Inventors: Kenji Miyamoto, Yokohama (JP); Yasuhiro Kurahashi, Mitaka (JP); Hiroki Kano, Takahagi (JP)

(73) Assignee: Seikagaku Corporation, Tokyo (JP)

( * ) Notice: Subject to any disclaimer, the term of this patent is extended or adjusted under 35 U.S.C. 154(b) by 36 days.

(21) Appl. No.: 10/024,666

(22) Filed: Dec. 18, 2001

(65) Prior Publication Data

US 2002/0143121 A1 Oct. 3, 2002

(30) Foreign Application Priority Data

Dec. 19, 2000  (JP) ........................................ 2000-385737

(51) Int. Cl.$^7$ ...................... A61K 31/715; A61K 31/19; C08B 37/00; C07C 63/64
(52) U.S. Cl. ........................... 514/54; 536/53; 514/568; 562/495
(58) Field of Search ............................ 536/53; 562/495; 514/54, 568

(56) References Cited

U.S. PATENT DOCUMENTS

| 5,462,976 A |   | 10/1995 | Matsuda et al. ............... 522/74 |
| 5,789,462 A | * | 8/1998 | Motani et al. ............... 523/106 |
| 6,025,444 A | * | 2/2000 | Waki et al. .................. 525/293 |
| 6,031,017 A | * | 2/2000 | Waki et al. ................... 522/84 |

FOREIGN PATENT DOCUMENTS

| EP | 0 713 859 | 11/1995 | ........... B32B/27/36 |

* cited by examiner

*Primary Examiner*—Kathleen K. Fonda
(74) *Attorney, Agent, or Firm*—David G. Conlin; John B. Alexander; Edwards & Angell, LLP

(57) ABSTRACT

A photocurable hyaluronic acid derivative of the present invention comprises hyaluronic acid and a photoreactive crosslinking group bonded thereto, wherein a 1.0 wt. % aqueous solution of the photocurable hyaluronic acid derivative obtained by dissolving the solid photocurable hyaluronic acid derivative in an aqueous solvent, is capable of passing through a porous filter having a pore size of 0.45 μm and a diameter of 25 mm at a rate of not less than 2 ml/minute at 24° C. under a pressure of 5.0 Kg/cm$^2$; and a process for producing the photocurable hyaluronic acid derivative; and a photocured crosslinked-hyaluronic acid derivative; a medical material using the photoreactive hyaluronic acid derivative and a medical material using the photocured crosslinked-hyaluronic acid derivative.

16 Claims, No Drawings

PHOTOCURABLE HYALURONIC ACID DERIVATIVE AND PROCESS FOR PRODUCING THE SAME, AND PHOTOCURED CROSSLINKED-HYALURONIC ACID DERIVATIVE AND MEDICAL MATERIAL USING THE SAME

BACKGROUND OF THE INVENTION

The present invention relates to a photocurable hyaluronic acid derivative and a process for producing the photocurable hyaluronic acid derivative, and a photocured crosslinked-hyaluronic acid derivative and a medical material using the photocured crosslinked-hyaluronic acid derivative.

Conventionally, there are known techniques for enhancing an in vivo retentivity of hyaluronic acid by subjecting the hyaluronic acid derivative to crosslinking reaction to control a biodegradability thereof (JP-W 3-503704(1991): the term "JP-W" as used herein means an "unexamined published Japanese international patent application"). There has been already proposed the method capable of simply conducting a crosslinking reaction of hyaluronic acid and readily removing unreacted crosslinking groups for ensuring a high safety by using a crosslinking group (photoreactive crosslinking group) having a photoreactive residue (JP-A 6-73102(1994), JP-A 8-143604(1996) and JP-A 9-86336 (1997): the term "JP-A" as used herein means an "unexamined published Japanese patent application").

When a photoreactive crosslinking group is bonded to hyaluronic acid to convert the hyaluronic acid into a photocurable hyaluronic acid derivative, a hydroxyl or carboxyl group of the hyaluronic acid is substituted with the photoreactive crosslinking group, so that an inherent hydrophilic property of the hyaluronic acid is deteriorated. The deterioration of the hydrophilic property of the hyaluronic acid adversely affects its molecular dispersibility in an aqueous solvent upon forming an aqueous solution thereof. When the photocurable hyaluronic acid derivative is photocrosslinked for using as drugs or medical equipment, it is preferred that an aqueous solution of the photocurable hyaluronic acid derivative is previously filtered through a microfilter, etc., for sterilization, removal of foreign matters and the like. For this purpose, it is required to prepare such an aqueous solution in which the photocurable hyaluronic acid derivative is sufficiently dissolved. Therefore, the above deterioration of the hydrophilic property caused upon conversion into the photocurable hyaluronic acid derivative is disadvantageous.

As a result of the present inventors' earnest studies for solving the above problems, it has been unexpectedly found that when the photocurable hyaluronic acid derivative having a photoreactive crosslinking group bonded thereto is treated with alkali such as sodium hydrogen carbonate, the hydrophilic property thereof can be considerably enhanced. The thus alkali-treated photocurable hyaluronic acid derivative has a high hydrophilic property as compared to the untreated one and, therefore, can show unexpected properties such as high molecular dispersibility in an aqueous solvent upon forming an aqueous solution thereof. The present invention has been attained on the basis of this finding.

SUMMARY OF THE INVENTION

An object of the present invention is to provide a photocurable hyaluronic acid derivative capable of exhibiting a high hydrophilic property and having an improved filterability of the aqueous solution thereof.

Another object of the present invention is to provide a photocured crosslinked-hyaluronic acid derivative produced by subjecting the photocurable hyaluronic acid derivative to photoreactive crosslinking, and a medical material comprising the photocured crosslinked-hyaluronic acid derivative.

To accomplish the aims, in a first aspect of the present invention, there is provided a photocurable hyaluronic acid derivative comprising hyaluronic acid and a photoreactive crosslinking group bonded thereto, wherein a 1.0 wt. % aqueous solution of the photocurable hyaluronic acid derivative, which is obtained by dissolving the solid photocurable hyaluronic acid derivative in an aqueous solvent, is capable of penetrating a porous filter having a pore size of 0.45 $\mu$m and a diameter of 25 mm at a rate of not less than 2 ml/minute at 24° C. under a pressure of 5.0 Kg/cm$^2$.

In a second aspect of the present invention, there is provided a process for producing a photocurable hyaluronic acid derivative which comprises treating an aqueous solution of hyaluronic acid having a photoreactive crosslinking group bonded thereto with alkali.

In a third aspect of the present invention, there is provided a photocured crosslinked-hyaluronic acid derivative produced by irradiating the photocurable hyaluronic acid derivative with ultraviolet rays.

In a fourth aspect of the present invention, there is provided a photocured crosslinked-hyaluronic acid derivative solution produced by irradiating an aqueous solution of the photocurable hyaluronic acid derivative with ultraviolet rays, wherein the photocured crosslinked-hyaluronic acid derivative aqueous solution having a concentration of 1.0% by weight is capable of forming a continuous thread having a length of not less than 3 cm which is formed without break from a tip open end of an 23-gauge injection needle when extruded from the injection needle at 24° C. at a rate of 0.2 ml/second in the direction of 45° downward from a horizontal direction.

In a fifth aspect of the present invention, there is provided a medical material comprising the photocurable hyaluronic acid derivative.

In a sixth aspect of the present invention, there is provided a medical material comprising the photocured crosslinked-hyaluronic acid derivative.

DETAILED DESCRIPTION OF THE INVENTION

The present invention will be described in detail below.

First, the process for producing photocurable hyaluronic acid derivative of the present invention is described.

In the present invention, the photocurable hyaluronic acid derivative can be produced by treating an aqueous solution of hyaluronic acid derivative having a photoreactive crosslinking group bonded thereto with alkali.

The hyaluronic acid used herein is not particularly restricted, and there may be generally used those derived from natural substances, preferably from the vertebrata or microorganism. The hyaluronic acid has a weight-average molecular weight of usually 400,000 to 10,000,000, preferably 600,000 to 6,000,000. The carboxyl group of the hyaluronic acid may be present in any form, e.g., in the form of a salt such as alkaline metal salt or alkaline earth metal salt. Among these salts, sodium salts or potassium salts are preferred.

The photoreactive crosslinking group (i.e., crosslinking group having a photoreactive residue) may be bonded to the position of a carboxyl group or hydroxyl group of the hyaluronic acid, preferably to the position of the carboxyl group because the introduction reaction of the photoreactive crosslinking group into the carboxyl group is more readily caused. The photoreactive crosslinking group may be any residue of compounds capable of undergoing a photodimerization reaction or a photopolymerization reaction by irradiation with ultraviolet rays. Specific example of the compounds capable of forming the above-mentioned photoreactive residue may include cinnamic acid, substituted cinnamic acids such as aminocinnamic acid (i.e., cinnamic acid in which any of hydrogen atoms bonded to its benzene ring is substituted with an amino group), preferably p-aminocinnamic acid, acrylic acid, maleic acid, fumaric acid, sorbic acid, coumarin, thymine or the like. Among these compounds, preferred are those compounds having a vinylene group capable of forming a cyclobutane ring by light irradiation, and cinnamic acid or substituted cinnamic acids (especially aminocinnamic acid) are more preferred from the point of view photoreactivity and safety. In addition, in order to effectively prevent the hyaluronic acid from being adversely affected by the photoreactive residue, it is preferred that the photoreactive residue is bonded to the hyaluronic acid through a spacer. Therefore, cinnamic acid derivatives or substituted cinnamic acid derivatives having such a spacer bonded thereto are most preferably used as the photoreactive crosslinking group.

Specific examples of the most preferred photoreactive crosslinking groups may include aminoalkyl cinnamate derivatives obtained by ester-bonding an amino alcohol represented by the formula: $H_2N—(CH_2)_n—OH$ or $H_2N—(CH_2—O)_m—CH_2—OH$, wherein n is 1 to 18 and m is 1 to 9, to the carboxyl group of cinnamic acid (Ph—CH=CH—CO—O—$(CH_2)_n$—$NH_2$, Ph—CH=CH—CO—O—$(CH_2=O)_m$—$NH_2$, wherein n and m are represented above, Ph represents a phenyl group); cinnamic acid derivatives to which a diamine represented by the formula: $H_2N—(CH_2)_l—NH_2$, wherein l is 1 to 10, or a diol represented by the formula: HO—$(CH_2)_k$—OH, wherein k is 1 to 10, is introduced to the carboxyl group of cinnamic acid (Ph—CH=CH—CO—NH—$(CH_2)_l$—$NH_2$, Ph—CH=CH—CO—O—$(CH_2)_k$—OH, wherein l, k and Ph are represented above); substituted cinnamic acid derivatives obtained by introducing an amino acid represented by the formula: HOOC—$(CHR)_j$—$NH_2$, wherein j is 1 to 10 and R is side chain of amino acid peptide, etc., into substituted cinnamic acids such as aminocinnamic acid (HOOC—CH=CH—Ph—NH—CO—$(CH_2)_j$—$NH_2$, HOOC—CH=CH—Ph—NH—(Peptide), wherein R, j and Ph are represented above); or the like. Among these photoreactive crosslinking groups, the aminoalkyl cinnamate derivatives obtained by introducing an amino alcohol into the carboxyl group of cinnamic acid are especially preferred. The number n of the above formula representing the amino alcohol is preferably 1 to 18, more preferably 3 to 6, still more preferably 3 to 4. In particular, when the aminoalkyl cinnamate is used as the photoreactive crosslinking group, the amino group of the aminoalkyl moiety and the carboxyl group of the hyaluronic acid constitute an amide bond through which the photoreactive crosslinking group is bonded to the hyaluronic acid.

As the method of producing the hyaluronic acid having the photoreactive crosslinking group bonded thereto, there may be exemplified a method using a water-soluble condensing agent such as water-soluble carbodiimide, e.g., 1-ethyl-3-(3-dimethylaminopropyl)carbodiimide hydrochloride (EDCI.HCl), 1-cyclohexyl-3-(2-morpholinoethyl) carbodiimide-metho-p-toluenesulfonate, 1-cyclohexyl-3-(2-morpholinoethyl)carbodiimide hydrochloride and the like; a method using an auxiliary condensing agent such as N-hydroxysuccinimide (HOSu) and N-hydroxybenzotriazole (HOBt) in addition to the above condensing agent; active esterification method; acid anhydride method; or the like. Among these methods, preferred are those conducted in the presence of an aqueous solvent, i.e., the methods using the water-soluble condensing agent or the combination of the reaction assistant and the water-soluble condensing agent. As the aqueous solvent, there may be used water solely or a mixed solvent composed of water and a water-miscible organic solvent such as dioxane, dimethylformamide (DMF), acetone, alcohol (e.g. methanol, ethanol, etc.) and the like.

Meanwhile, in the present invention, the degree of substitution of the photoreactive crosslinking group incorporated into hyaluronic acid (DS), which may be measured by the method described in Examples below, is usually 0.3 to 30%, preferably 1 to 20%, more preferably 2 to 10%. The degree of substitution of the photoreactive crosslinking group may be appropriately varied or adjusted by controlling moles of the hyaluronic acid and photoreactive crosslinking group to be reacted with each other. The molecular weight of the obtained photocurable hyaluronic acid derivative varies depending upon the introduction percentage of the photoreactive crosslinking group, and is usually 400,000 to 10,000,000, preferably 600,000 to 6,000,000.

An aqueous solution of the photocurable hyaluronic acid derivative can be produced by treating an aqueous solution of hyaluronic acid derivative having the photoreactive crosslinking group bonded thereto, preferably a reaction solution obtained after introducing the photoreactive crosslinking group into hyaluronic acid, with alkali. The alkali used is not particularly restricted, and may be in the form of either organic or inorganic salts. In the consideration of treatment in the aqueous solvent, the use of the inorganic alkali salts is preferred. Among these inorganic alkali salts, weak alkali salts such as sodium hydrogen carbonate and sodium carbonate are more suitably used as compared to strong alkali salts such as sodium hydroxide since such weak alkali salts have a less influence on conversion of photoreactive hyaluronic acid derivative into low-molecular compounds or decomposition of the crosslinking group. Here, the alkali treatment may be conducted at a pH value of usually 7.2 to 11, preferably 7.5 to 10.

The amount of the alkali used and the alkali-treating time may be appropriately controlled depending upon the aimed hydrophilic property (i.e., filtratability as described below). For example, when sodium hydrogen carbonate is used in an amount of 500 mg based on 1 g of hyaluronic acid (i.e., in a molar amount 10 times or more the mole of hyaluronic acid), the alkali treatment may be conducted for 2 to 3 hours under stirring, thereby obtaining the photocurable hyaluronic acid derivative having a sufficiently enhanced hydrophilic property.

The thus prepared photocurable hyaluronic acid derivative may be subjected, if required, to neutralization using an organic acid such as acetic acid, or inorganic acid, and then to various post-treatments ethanol precipitation, ethanol washing and drying, thereby enabling the photocurable hyaluronic acid derivative to be isolated.

Next, the photocurable hyaluronic acid derivative having an enhanced hydrophilic property according to the present invention is described in detail below.

The photocurable hyaluronic acid derivative having an enhanced hydrophilic property according to the present invention has the same chemical structure as that of the photocurable hyaluronic acid derivative obtained by the above-described conventional methods using a photoreactive crosslinking group, but is different in high-order structure (i.e., stereostructure) from that of the conventional photocurable hyaluronic acid derivatives. This results in different properties therebetween.

Therefore, the photocurable hyaluronic acid derivative of the present invention can be clearly distinguished from conventional ones by its high molecular dispersibility in an aqueous solvent upon forming an aqueous solution thereof. More specifically, the photocurable hyaluronic acid derivative of the present invention has such a feature that a 1.0 wt. % aqueous solution of the photocurable hyaluronic acid derivative obtained by dissolving the solid photocurable hyaluronic acid derivative in an aqueous solvent is capable of passing through a porous filter having a pore diameter of 0.45 um and a diameter of 25 mm at a rate of not less than 2 ml/minute at 24° C. under a pressure of 5.0 Kg/cm$^2$. The high filtratability of the aqueous solution of the photocurable hyaluronic acid derivative shows that the photocurable hyaluronic acid derivative has a high molecular dispersibility in an aqueous solvent upon forming an aqueous solution thereof. The filtratability may be determined by comparing the concentration of the photocurable hyaluronic acid derivative in the aqueous solution after passing through the filter with that before passing through the filter. In the case where the aqueous photocurable hyaluronic acid derivative solution of the present invention is passed through the filter under the above conditions, the concentration of the photocurable hyaluronic acid derivative in the aqueous solution remains unchanged between before and after passing through the filter. The photocurable hyaluronic acid derivative of the present invention exhibits the following essential properties.

In the conventional methods using a photoreactive crosslinking group, after the photoreactive crosslinking group is introduced into hyaluronic acid to obtain the photocurable hyaluronic acid derivative, the resultant aqueous reaction solution containing the photocurable hyaluronic acid derivative is subjected to post-treatments such as ethanol precipitation, ethanol washing and drying, thereby obtaining a solid photocurable hyaluronic acid derivative. However, since the solid photocurable hyaluronic acid derivative has a considerably low water solubility as compared to that of the raw hyaluronic acid, it sometimes becomes difficult to sufficiently dissolve the photocurable hyaluronic acid derivative in the aqueous solvent again. In such a case, even though the porous filter-passing through test is conducted to determine the molecular dispersibility, the photocurable hyaluronic acid derivative cannot be passed through the filter. On the other hand, the photocurable hyaluronic acid derivative of the present invention can show the substantially same water solubility as that of the raw hyaluronic acid. Therefore, the solid photocurable hyaluronic acid derivative of the present invention can be dissolved in the aqueous solvent without insolubilization or gelation.

The photocurable hyaluronic acid derivative is used as a biomedical material, e.g. an antiadhesion material (preventing adhesions during or after surgery), space-occupying material, artificial body fluid material (artificial synovial fluid, artificial tears and eye drops).

Next, the photocured crosslinked-hyaluronic acid derivative of the present invention will be described below.

The photocured crosslinked-hyaluronic acid derivative of the present invention (crosslinked product) can be produced by irradiating the above photocurable hyaluronic acid derivative of the present invention with ultraviolet rays.

Since the photocurable hyaluronic acid derivative having an enhanced hydrophilic property of the present invention has the substantially same water solubility as that of the raw hyaluronic acid, the photocurable hyaluronic acid derivative can be readily cast into a desired mold or readily filled into a container such as syringe, upon irradiating ultraviolet rays thereonto. As explained above as to the molecular dispersibility, since the photocurable hyaluronic acid derivative of the present invention can be readily passed through the porous filter. Therefore, by subjecting the photocurable hyaluronic acid derivative to such a filtration before crosslinking reaction thereof by the ultraviolet rays irradiation, it is possible to readily remove foreign matters therefrom or subject the photocurable hyaluronic acid derivative to sterilization process, thereby facilitating the production of a clean photocured crosslinked-hyaluronic acid derivative.

The ultraviolet rays irradiated may be selected from those having a wavelength capable of subjecting the photoreactive crosslinking group to photoreaction without cleavage of glycoside bond of the hyaluronic acid, e.g., a wavelength of 200 to 600 nm. As a preferred light source, there may be used a high-pressure mercury lamp or a metal halide lamp. These light sources are preferably provided with a cut filter for removing unnecessary wavelength rays emitted therefrom. As the cut filter, there is preferably used a special processed filter, but an ordinary hard glass filter may also be used as the cut filter.

The photocured crosslinked-hyaluronic acid derivative of the present invention may be of various configurations or forms depending upon concentration, crosslinking percentage and the like. In the case where photoreactive residues such as cinnamic acid or substituted cinnamic acids capable of forming dimers by photoreaction are used, the crosslinking percentage of the photocured crosslinked-hyaluronic acid derivative can be expressed by a ratio (percentage) of two times moles of resultant dimers to moles of the photoreactive crosslinking group introduced into hyaluronic acid.

Typical configurations or forms of the photocured crosslinked-hyaluronic acid derivative may include amorphous forms such as solution and gel, and shaped forms such as elastic bodies, e.g., sheets, films, pellets, tubes or the like. The above photocured crosslinked-hyaluronic acid derivative gel may be more readily produced by using the aqueous photocurable hyaluronic acid derivative solution as a raw material whose concentration is increased to 1.0 to 3.0% by weight. Whereas, the above elastic bodies may be produced by irradiating the photocurable hyaluronic acid derivative having a concentration as high as 3 to 10% by weight, with ultraviolet rays. More specifically, when the aqueous photocurable hyaluronic acid derivative solution having such a high concentration is subjected to crosslinking reaction, near-solid products, i.e., elastic bodies containing the aqueous solvent, can be produced. Meanwhile, the gel is generally defined as a polymer and a swollen material thereof which are insoluble in any solvent and have a three-dimensional network structure, and a swelled product of such a polymer (refer to "New-Edition Polymer Dictionary" published by Asakura Shoten, Nov. 25, 1988, page 129). However, in the present specification, the "solution" is defined as those capable of being extruded from a 23-gauge injection needle at 24° C. under a pressure of 5.0 Kg/cm$^2$, and the "gel" is defined as those incapable of being extruded under the above conditions.

Next, the photocured crosslinked-hyaluronic acid derivative solution having a high tread-formability according to the present invention will be described. Here, the high tread-formability is a property exclusively exhibited by the solution only, and more specifically, means such a property capable of forming a continuous thread having a length of usually not less than 3 cm which is formed without break from a tip open end of an 23-gauge injection needle, when the photocured crosslinked-hyaluronic acid derivative-containing solution having a concentration of 1.0% by weight is extruded from the injection needle at 24° C. at a rate of 0.2 ml/second in the direction of 45° downward from a horizontal direction. It is known that a tread-formability of a hyaluronic acid solution is due to its polymeric property. However, the high tread-formability exhibited by the photocured crosslinked-hyaluronic acid derivative solution of the present invention is considerably different from that of the conventional hyaluronic acid solution. The length of the thread formed from the tip open end of the injection needle is preferably not less than 5 cm, more preferably not less than 7 cm. On the contrary, in the case of the conventional 1.0-wt. % hyaluronic acid solution, the length of the thread formed is less than 1 cm.

The above high tread-formability of the photocured crosslinked-hyaluronic acid derivative solution according to the present invention can be obtained by appropriately controlling the concentration of the raw material (aqueous photocurable hyaluronic acid derivative solution) and the crosslinking percentage of the cross-linked product (photocured crosslinked-hyaluronic acid derivative solution) obtained by the ultraviolet irradiation. The concentration of the aqueous photocurable hyaluronic acid derivative solution and the crosslinking percentage of the photocured crosslinked-hyaluronic acid solution are controlled to usually 0.1 to 1.0% by weight and 3 to 40%, respectively, preferably 0.3 to 1.0% by weight and 4 to 35%, respectively, more preferably 0.3 to 1.0% by weight and 5 to 30%, respectively.

The photocurable hyaluronic acid derivative having an enhanced hydrophilic property according to the present invention exhibits a high photocrosslinking efficiency, i.e., can be readily crosslinked at a percentage as high as usually not less than 10%, preferably not less than 20%. Therefore, when the photocurable hyaluronic acid derivative is converted into the photocured crosslinked-hyaluronic acid derivative in the form of solution, gel or elastic bodies, these products can exhibit a high heat resistance as compared to ordinary hyaluronic acid and the conventional photocured crosslinked-hyaluronic acid derivative. More specifically, the photocured crosslinked-hyaluronic acid derivative and its solution according to the present invention are free from deterioration in configuration or high tread-formability thereof even when subjected to moist heat sterilization at 121° C. for 20 minutes which is one of guaranteed sterilization conditions required for drugs or medical equipment. The heat resistance tends to become higher as the crosslinking percentage of the photocured crosslinked-hyaluronic acid derivative is increased. When the photocured crosslinked-hyaluronic acid derivative has a crosslinking percentage of usually 5 to 70%, preferably 10 to 80%, the obtained products can exhibit a high heat resistance.

In general, hyaluronic acid has a low heat resistance and, therefore, suffers from cleavage of glycoside bond thereof when subjected to moist heat sterilization at 121° C., thereby causing decrease in its molecular weight. The good configuration and good properties exhibited by high-molecular weight hyaluronic acid are deteriorated or eliminated accompanied with the decreasing of the molecular weight of hyaluronic acid. On the contrary, the good configuration and excellent properties exhibited by the photocured crosslinked-hyaluronic acid derivative of the present invention can be maintained without deterioration or elimination thereof even when the cleaveage of glycoside bond is caused by the heat-treatment. Specifically, the photocured crosslinked-hyaluronic acid derivative gel can be kept in a gelled state even after the moist heat sterilization, and the sheet produced from the photocured crosslinked-hyaluronic acid derivative can be kept in the form of a sheet even after the moist heat sterilization. It is considered that such a high heat-resistance of the photocured crosslinked-hyaluronic acid derivative is mainly attributed to its three-dimensional network structure constituted from intermolecular bonds other than glycoside bond formed by the photocrosslinking reaction. The photocured crosslinked-hyaluronic acid derivative is used as a biomedical material, e.g., an antiadhesion material (preventing adhesions during or after surgery), space-occupying material, artificial body fluid material (artificial synovial fluid, artificial tears and eye drops).

In accordance with the present invention, there are provided a photocurable hyaluronic acid derivative having an enhanced hydrophilic property, and a process for producing the photocurable hyaluronic acid derivative. Thus, the present invention can considerably contribute to the field of medical materials using hyaluronic acid.

EXAMPLES

Examples of the present invention are given below by way of illustration.

(1) Filtratability Test

A test sample was prepared by adjusting its concentration to 1.0% by weight using a 5 mM phosphate-buffered physiological saline. The thus obtained test sample was forced to pass through a porous filter having a pore size of 0.45 um and a diameter of 25 mm at 24° C. under a pressure of 5.0 $Kg/cm^2$ to measure an amount (ml) of the test sample filtrated per one minute. Rank "A" is assigned to test samples having a filtratability of not less than 2 ml/min.; Rank "B" is assigned to those having a filtratability of less than 2 ml/min.; and Rank "C" is assigned to those having no filtratability.

(2) Configuration Test

The test sample (24° C.) was filled in a 5 ml syringe with a 23-gauge injection needle, and extruded through the injection needle at 24° C. under a pressure of 5.0 $Kg/cm^2$. Extrudable test samples were classified into "solutions", and non-extrudable ones were classified into "gels".

(3) Stringing (Thread-Formability) Test

A test sample was prepared by adjusting its concentration to 1.0% by weight using a 5 mM phosphate-buffered physiological saline. The thus prepared test sample (24° C.) was filled in a 5 ml syringe with a 23-gauge injection needle, and extruded through the injection needle at 24° C. at a rate of 0.2 ml/second in the direction of 45° downward from horizontal, to measure a length of a thread formed from the injection needle without break. Test samples capable of forming a break-free thread having a length of not less than 7 cm were expressed by "++"; those capable of forming a break-free thread having a length of from 3 cm to less than 7 cm were expressed by "+"; and those capable of forming a break-free thread having a length of less than 3 cm were expressed by "−".

(4) Degree of Crosslinking Agent Substitution (DS)

The degree of a crosslinking agent substituted (DS) is expressed by percent of the number of photoreactive crosslinking groups introduced per a repeating disaccharide unit of hyaluronic acid. The amount of the hyaluronic acid required for the calculation of the introduction percentage was measured by a carbazole measuring method using a calibration curve. In the case where cinnamic acid or aminocinnamic acid was used as a photoreactive residue of the photoreactive crosslinking group, the amount of cinnamic acid or aminocinnamic acid is measured by absorptiometry (measuring wavelength: 269 nm) using a calibration curve.

(5) Crosslinking Percentage

The crosslinking percentage was measured as follows. That is, 1 g of a test sample was saponified with 1 ml of a 1M sodium hydroxide solution. The obtained solution was acidified and then extracted with ethyl acetate to obtain substances (monomers and dimers) derived from the photoreactive crosslinking group. The thus extracted substances were analyzed by high performance liquid chromatography (HPLC) to measure an amount of the dimers by a calibration curve method. Then, from the measured value, the percentage of the number of moles of the photoreactive crosslinking group in the dimers based on that of the photoreactive crosslinking group introduced into hyaluronic acid was calculated.

(6) Viscosity

The viscosity was expressed by the value (Pa·s) measured at 25° C. under conditions of 3°×R14 and 1 ppm using an E-type rotational viscometer.

Example 1

Aminocinnamic Acid Derivative-Introduced Hyaluronic Acid 400 mg of sodium hyaluronate having a weight-average molecular weight of about 900,000 was dissolved in 60 ml of water, and then mixed with 30 ml of dioxane. To the resultant solution was sequentially mixed 34 mg of N-hydroxy succinimide; 1 ml of water; 29 mg of EDCI.HCl; 1 ml of water; 51 mg of 4-(6-aminohexanamide)ethyl cinnamate hydrochloride represented by the formula: $HCl.H_2N-(CH_2)_5CONH-Ph-CH=CH-COOCH_2CH_3$, wherein Ph represents a phenyl group; and 1 ml of water, at room temperature. The resultant mixture was stirred for 3 hours.

The obtained mixture was further mixed with 1 ml of a 1M sodium hydroxide aqueous solution, stirred for 1 hour and 30 minutes, and then mixed with 1.6 ml of a 25 wt. % sodium chloride aqueous solution. The resultant reaction solution was charged into 300 ml of ethanol to precipitate a solid. The obtained solid was successively washed with 80% (vol./vol.) ethanol two times and then with ethanol two times, and then dried overnight at 40° C., thereby obtaining 360 mg of a white solid (4-(6-aminohexanamide)ethyl cinnamate bound hyaluronic acid: "(4-(6-aminohexanamide) ethyl cinnamate bound hyaluronic acid" is hereinafter referred to merely as "aminocinnamic acid derivative-introduced hyaluronic acid") as an aimed compound. It was confirmed that the degree of the aminocinnamic acid derivative substitution per a repeating disaccharide unit of hyaluronic acid (DS) was 4.5%. The results of the filtratability test for the thus obtained compound are shown in Table 1. Meanwhile, the same procedure as defined above was conducted except that the 1M sodium hydroxide aqueous solution was not added, thereby obtaining an aminocinnamic acid derivative-introduced hyaluronic acid having a degree of the aminocinnamic acid derivative substitution of 4.5%. The thus obtained aminocinnamic acid derivative-introduced hyaluronic acid was used as a control 1.

Then, the aminocinnamic acid derivative-introduced hyaluronic acid was dissolved in a 5 mM phosphate-buffered physiological saline such that the concentration of the obtained solution became 0.2 to 2.5% by weight calculated as hyaluronic acid. Further, the resultant solution was charged into a Pyrex-glass test tube having an inner diameter of 15 mm, and separately interposed between a pair of Pyrex-glass plates whose clearance was set to 2 mm, and then irradiated with ultraviolet rays for 20 minutes using a water-cooling ultraviolet irradiating device (3 kW metal halide lamp) to examine the configuration and thread formability (for solution) of the obtained cross-linked product. The results are shown in Table 2. Meanwhile, hyaluronic acid is hereinafter referred to merely as "HA".

TABLE 1

| Test sample | Filtratability |
|---|---|
| Example 1 | A |
| Control | C |

TABLE 2

| HA concentration (wt. %) | Configuration | Thread formability |
|---|---|---|
| 0.2 | Solution | − |
| 0.3 | Solution | + |
| 0.4 | Solution | + + |
| 0.5 | Solution | + + |
| 1.0 | Solution | + + |
| 2.0 | Gel | Not measured |
| 2.5 | Sheet* | Not measured |

Note:
*Configuration formed after the test sample interposed between a pair of Pyrex-glass plates was irradiated with ultraviolet rays.

Example 2

Cinnamic Acid Derivative-Introduced Hyaluronic Acid 500 g of a 1 wt. % aqueous solution of sodium hyaluronate having a weight-average molecular weight of 900,000 was mixed with a mixed solution containing 250 ml of water and 375 ml of dioxane under stirring. To the resultant solution was sequentially mixed 860 mg of N-hydroxy succinimide; 2 ml of water (0.6 equivalent/HA disaccharide unit (mol/mol)); 717 mg of EDCI.HCl; 2 ml of water (0.3 equivalent/HA disaccharide unit (mol/mol)); 903 mg of 3-aminopropyl cinnamate hydrochloride represented by the formula: $HCl.H_2N-(CH_2)_3OCO-CH=CH-Ph$, wherein Ph represents a phenyl group; and 2 ml of water (0.3 equivalent/HA disaccharide unit (mol/mol)), at room temperature. The resultant mixture was stirred for 2 hours and 30 minutes. The obtained mixture was further mixed with 2.5 g of sodium hydrogen carbonate and 50 ml of water, stirred for one day, and then mixed with 30 g of sodium chloride. 2 liters of ethanol was charged into the resultant reaction solution to precipitate solid. The obtained solid was successively washed with 80% (vol./vol.) ethanol two times and then with ethanol two times, and then dried overnight at room temperature, thereby obtaining 5.24 g of a white solid (3-aminopropyl cinnamate bound hyaluronic acid: "3-aminopropyl cinnamate bound hyaluronic acid" is hereinafter referred to merely as "cinnamic acid derivative-introduced hyaluronic acid") as an aimed compound. It was confirmed that the DS of the cinnamic acid derivative was 8.4% (see No. 5 of Table 3). Further, the same procedure as defined above was conducted except that the equivalent amounts of N-hydroxy succinimide (HOSu), EDCI.HCl and aminopropyl cinnamate hydrochloride were changed, thereby obtaining various cinnamic acid derivative-introduced hyaluronic acid (Nos. 1 to 4) having different introduction percentages from each other.

Then, the cinnamic acid derivative-introduced hyaluronic acid Nos. 1 to 5 were respectively dissolved in a 5 mM phosphate-buffered physiological saline such that the concentration of the obtained respective solutions became 1.0% by weight calculated as hyaluronic acid. The thus obtained respective cinnamic acid derivative-introduced hyaluronic acid solutions were tested to examine the filtratability thereof. The results are shown in Table 3. Also, the same procedure for the production of the above compounds Nos. 1 to 5 as defined above was conducted except that the sodium hyaluronate having a weight-average molecular weight of about 900,000 as raw material and the mixture of 2.5 g of sodium hydrogen carbonate and 50 ml of water were not added, thereby obtaining cinnamic acid derivative-introduced hyaluronic acid as controls. These controls were tested to examine the filtratability thereof. Meanwhile, the hyaluronic acid as a raw material showed a filtratability of rank "A".

TABLE 3

| Compound No | Equivalent amount charged (mol/mol-HA disaccharide unit) | | |
|---|---|---|---|
| | HOSu | EDCI · HCl | Aminopropyl cinnamate |
| 1 | 0.2 | 0.10 | 0.10 |
| 2 | 0.3 | 0.15 | 0.15 |
| 3 | 0.4 | 0.20 | 0.20 |
| 4 | 0.5 | 0.25 | 0.25 |
| 5 | 0.6 | 0.30 | 0.30 |

| Compound No | Degree of substitution (DS) (%) | Filtratability | |
|---|---|---|---|
| | | cinnamic acid derivative-introduced hyaluronic acid | Control |
| 1 | 2.6 | A | C |
| 2 | 4.4 | A | C |
| 3 | 5.3 | A | C |
| 4 | 6.2 | A | C |
| 5 | 8.4 | A | C |

As shown in Table 3, it was confirmed that the cinnamic acid derivative-introduced hyaluronic acid not treated with alkali (sodium hydrogen carbonate) exhibited no filtratability, while the alkali-treated cinnamic acid derivative-introduced hyaluronic acid exhibited a high filtratability and, therefore, a high hydrophilic property.

Meanwhile, as the DS of cinnamic acid derivative became higher (i.e., the hydrophobic property became higher), the amount of insolubles in the aqueous solvent was increased, and the obtained solution became more opaque. On the contrary, the cinnamic acid derivative-introduced hyaluronic acid of the present invention exhibited a high filtratability and a high hydrophilic property and, therefore, a high transparency.

Example 3

Various Crosslinked Hyaluronic Acid Derivatives

The same procedure as defined in Example 2 was conducted except that the 1.0 wt. % mixed solution containing the cinnamic acid derivative-introduced hyaluronic acid and the phosphate-buffered physiological saline was irradiated with ultraviolet rays using a water-cooled ultraviolet irradiating device. The results are shown in Table 4.

TABLE 4

| Cinnamic acid derivative-introduced HA | Ultraviolet rays irradiation time (min.) | Configuration | Viscosity (Pa · s) | Crosslinking percentage (%) |
|---|---|---|---|---|
| No. 1 | 30 | Gel | 28 | 6.7 |
| | 20 | Gel | 24 | 5.3 |
| | 10 | Solution (Thread-formability: + +) | 23 | 3.4 |
| | 5 | Solution | 23 | 2.2 |
| No. 2 | 30 | Gel | 38 | 11.4 |
| | 20 | Gel | 35 | 7.3 |
| | 10 | Gel | 24 | 4.6 |
| | 5 | Solution (Thread-formability: + +) | 23 | 3.1 |
| No. 3 | 30 | Gel | 44 | 10.1 |
| | 20 | Gel | 35 | 9.9 |
| | 10 | Gel | 25 | 5.4 |
| | 5 | Solution (Thread-formability: + +) | 23 | 4.5 |
| No. 4 | 30 | Gel | 45 | 12.5 |
| | 20 | Gel | 44 | 10.2 |
| | 10 | Gel | 29 | 10.1 |
| | 5 | Solution (Thread-formability: + +) | 24 | 9.0 |
| No. 5 | 30 | Gel | 59 | 15.8 |
| | 20 | Gel | 50 | 14.4 |
| | 10 | Gel | 35 | 10.1 |
| | 5 | Solution (Thread-formability: + +) | 23 | 6.7 |

Example 4

Influence by Alkali with Passage of Time

One liter of a 1 wt. % aqueous solution of sodium hyaluronate having a weight-average molecular weight of 900,000 was mixed with a mixed solution containing 500 ml of water and 750 ml of dioxane under stirring. To the resultant solution was successively mixed 1.721 g of N-hydroxy succinimide; 4 ml of water (0.6 equivalent/HA disaccharide unit (mol/mol)); 1.433 g of EDCI.HCl; 4 ml of water (0.3 equivalent/HA disaccharide unit (mol/mol)); 1.807 g of aminopropyl cinnamate hydrochloride represented by the formula: $HCl.H_2N-(CH_2)_3OCO-CH=CH-Ph$, wherein Ph represents a phenyl group; and 4 ml of water (0.3 equivalent/HA disaccharide unit (mol/mol)), at room temperature. The resultant mixture was stirred for 2 hours and 30 minutes.

The obtained mixture was further mixed with 2.0 g of sodium hydrogen carbonate and 40 ml of water (0.2 g per 1 g of HA). After the elapse of 2, 3, 4, 6, 8 and 20 hours from the addition of the sodium hydrogen carbonate, 225 ml of the reaction solution was sampled at each time. Each sampled solution was mixed with 6 g of sodium chloride, and 2 liters of ethanol was charged to the resultant mixture to precipitate a cinnamic acid derivative-introduced hyaluronic acid. The obtained precipitate was successively washed with 80% (vol./vol.) ethanol two times and then with ethanol two times, and then dried overnight at room temperature, thereby obtaining a cinnamic acid derivative-introduced hyaluronic acid in the form of a white solid. Further, the same procedure as defined above was conducted except that the sodium hydrogen carbonate was not added, thereby obtaining a cinnamic acid derivative-introduced hyaluronic acid as a control. These samples were tested to examine the filtratability thereof.

Then, the above respective samples were dissolved in a phosphate-buffered physiological saline such that the concentration of the obtained respective solutions became 1.5% by weight calculated as hyaluronic acid. Also, the same procedure as defined above was conducted except that the amount of sodium hydrogen carbonate was changed to 1 g (0.1 g per 1 g of HA) and 5 g (0.5 g per 1 g of HA), thereby obtaining similar derivatives. These derivatives were measured by the same method as defined above. The results are shown in Table 5.

TABLE 5

| Elapsed time after addition of sodium hydrogen carbonate | Filtratability Amount of sodium hydrogen carbonate added (g per 1 g of HA) | | | |
|---|---|---|---|---|
| | 0.5 | 0.2 | 0.1 | 0 |
| 2 | A | C | C | C |
| 3 | A | C | C | |
| 4 | A | C | C | |
| 6 | A | A | C | |
| 8 | A | A | C | |
| 20 | A | A | A | |

As shown in Table 5, it was confirmed that the cinnamic acid derivative-introduced hyaluronic acids not treated with alkali (sodium hydrogen carbonate) exhibited no filtratability, while the alkali-treated cinnamic acid derivative-introduced hyaluronic acids were drastically enhanced in filtratability and, therefore, showed a high hydrophilic property.

Example 5

Influence of Precipitation Method on Filtratability

In order to confirm that the filtratability was not influenced by a method of separating the photocurable hyaluronic acid derivative from its aqueous solution, the photocurable hyaluronic acid derivatives obtained by different precipitation methods were compared with each other as to the filtratability.

More specifically, a compound (A) of the present invention separated by precipitation method using ethanol after the addition of sodium chloride; a compound (B) of the present invention separated by precipitation method using a saturated solution of sodium acetate in ethanol; and a control compound separated by precipitation method using a saturated solution of sodium acetate in ethanol but not alkali-treated were examined as to filtratability thereof (see Table 6). As a result, it was confirmed that the control compound precipitated from the saturated solution of sodium acetate in ethanol without the alkali treatment could not exhibit any filtratability (i.e., the filtratability was not influenced by the kind of precipitation method.

TABLE 6

| Compound to be tested | Filtratability |
|---|---|
| Compound (A) (present invention) | A |
| Compound (B) (present invention) | A |
| Control compound | C |

Meanwhile, the compounds (A) and (B) and the control compound were prepared as follows.

(1) Preparation of Compound (A) of the Present Invention (i) 2,0 g of sodium hyaluronate having a weight-average molecular weight of 1,000,000 was dissolved in 300 ml of distilled water. After adding 150 ml of dioxane to the resultant solution, 344 mg of N-hydroxy succinimide (0.6 equivalent/HA disaccharide unit (mol/mol)); 286 mg of EDCI.HCl (0.3 equivalent/HA disaccharide unit (mol/mol)); and 362 mg of aminopropyl cinnamate hydrochloride represented by the formula: $HCl.H_2N(CH_2)_3OCO—CH=CH—Ph$, wherein Ph represents a phenyl group (0.3 equivalent/HA disaccharide unit (mol/mol)) were sequentially added thereto. The resultant mixture was stirred for 2 hours and 30 minutes at room temperature.

(ii) Then, the obtained mixture was further mixed with 1.0 g of sodium hydrogen carbonate, and stirred for 3 hours. The obtained reaction solution was neutralized by adding 0.2 ml of a 2.25M acetic acid aqueous solution thereto.

(iii) The neutralized solution was mixed with 12 g of sodium chloride and then with one liter of ethanol to precipitate a photocurable hyaluronic acid derivative. The obtained precipitate was successively washed with 80% (vol./vol.) ethanol two times and then with ethanol two times, and then dried under reduced pressure, thereby obtaining the compound (A) of the present invention.

(2) Preparation of Compound (B) of the Present Invention

After completion of the step (ii) for preparation of the compound (A) of the present invention, 100 ml of the reaction solution was sampled and charged into a saturated solution of acetic acid in ethanol, thereby precipitating a photocurable hyaluronic acid derivative. The obtained precipitate was washed with 80% ethanol two times and then with ethanol two times, and then dried under reduced pressure, thereby obtaining the compound (B) of the present invention.

(3) Preparation of Control Compound

After completion of the step (i) for preparation of the compound (A) of the present invention, 100 ml of the reaction solution was sampled and charged into a saturated solution of acetic acid in ethanol, thereby precipitating a photocurable hyaluronic acid derivative. The obtained precipitate was washed with 80% (vol./vol.) ethanol two times and then with ethanol two times, and then dried under reduced pressure, thereby obtaining the control compound.

Example 6

Crosslinked Hyaluronic Acid Gel After Moist Heat-Treatment 500 g of a 1 wt. % aqueous solution of sodium hyaluronate having a weight-average molecular weight of 900,000 was mixed a mixed solution containing 250 ml of water and 375 ml of dioxane under stirring. To the resultant solution was sequentially mixed with 860 mg of N-hydroxy succinimide; 2 ml of water (0.6 equivalent/HA disaccharide unit (mol/mol)); 717 mg of EDCI.HCl; 2 ml of water (0.3 equivalent/HA disaccharide unit (mol/mol)); 903 mg of aminopropyl cinnamate hydrochloride represented by the formula: HCl.H$_2$N(CH$_2$)$_3$OCO—CH=CH—Ph, wherein Ph represents a phenyl group; and 2 ml of water (0.3 equivalent/HA disaccharide unit (mol/mol)), at room temperature. The resultant mixture was stirred for 2 hours and 30 minutes.

Then, the obtained mixture was further mixed with 2.5 g of sodium hydrogen carbonate and 50 ml of water, stirred for one day, and then mixed with 0.676 g of acetic acid and then with 30 g of sodium chloride. 2 liters of ethanol was charged into the resultant reaction solution to precipitate a solid. The obtained solid was successively washed with 80% (vol./vol.) ethanol two times and then with ethanol two times, and then dried overnight at room temperature, thereby obtaining 4.93 g of a white solid (cinnamic acid derivative-introduced hyaluronic acid). It was confirmed that the percentage of the cinnamic acid derivative introduced per a repeating disaccharide unit of hyaluronic acid was 8.8%.

Then, the obtained cinnamic acid derivative-introduced hyaluronic acid was dissolved in a 5 mM phosphate-buffered physiological saline such that the concentration of the obtained solution was 1.5% by weight calculated as hyaluronic acid. Then, the resultant solution was charged into a glass syringe, and irradiated with ultraviolet rays for one hour using a water-cooling ultraviolet irradiating device, thereby obtaining a gel having a crosslinking percentage of 22.2% and a viscosity of 127 Pa·s. Further, the obtained photocured crosslinked hyaluronic acid derivative gel was subjected to moist heat sterilization at 121° C. for 20 minutes. As a result, it was confirmed that the sterilized product was kept in a gelled state, and had a viscosity of 136 Pa·s. These results showed that the above photocured crosslinked hyaluronic acid derivative gel was substantially free from degradation.

As discussed above, in accordance with the present invention, there are provided a photocurable hyaluronic acid derivative having an enhanced hydrophilic property, and a process for producing the photocurable hyaluronic acid derivative. Thus, the present invention can considerably contribute to the field of medical materials using hyaluronic acid.

What is claimed is:

1. A photocurable hyaluronic acid derivative comprising hyaluronic acid and a photoreactive crosslinking group bonded thereto, wherein a 1.0 wt. % aqueous solution of the photocurable hyaluronic acid derivative obtained by dissolving a solid photocurable hyaluronic acid derivative in an aqueous solvent, is capable of passing through a porous filter having a pore size of 0.45 µm and a diameter of 25 mm at a rate of not less than 2 ml/minute at 24° C. under a pressure of 5.0 Kg/cm$^2$ wherein the photoreactive crosslinking group is derived from cinnamic acid, substituted cinnamic acid or derivatives thereof.

2. The photocurable hyaluronic acid derivative according to claim 1, wherein the photoreactive crosslinking group is bonded to a carboxyl group of the hyaluronic acid.

3. The photocurable hyaluronic acid derivative according to claim 1, wherein the photoreactive crosslinking group is an aminoalkyl cinnamate residue.

4. The photocurable hyaluronic acid derivative according to claim 3, wherein the aminoalkyl cinnamate residue is represented by the formula (I):

Ph—CH=CH—CO—O—(CH$_2$)$_n$—NH     (I)

wherein n represents 3 to 4, Ph represents a phenyl group.

5. The photocurable hyaluronic acid derivative according to claim 4, wherein the aminoalkyl cinnamate residue is bonded to carboxyl group of hyaluronic acid.

6. The photocurable hyaluronic acid derivative according to claim 1, which further has a weight-average molecular weight of 400,000 to 10,000,000.

7. The process for producing a photocurable hyaluronic acid derivative as defined in claim 1, comprising treating an aqueous solution of hyaluronic acid derivative having a photoreactive crosslinking group bound thereto with alkali.

8. The process according to claim 7, which further comprises neutralizing the alkali-treated aqueous solution.

9. A photocured crosslinked-hyaluronic acid derivative produced by irradiating the photocurable hyaluronic acid derivative as defined in claim 1 with ultraviolet rays.

10. A photocured crosslinked-hyaluronic acid derivative produced by irradiating an aqueous solution containing the photocurable hyaluronic acid derivative as defined in claim 1 in an amount of 0.1 to 10% by weight, with ultraviolet rays.

11. A photocured crosslinked-hyaluronic acid derivative solution produced by irradiating an aqueous solution of the photocurable hyaluronic acid derivative as defined in claim 1 with ultraviolet rays, wherein the photocured crosslinked-hyaluronic acid derivative solution having a concentration of 1.0% by weight is capable of forming a continuous thread having a length of not less than 3 cm which is formed without break from a tip open end of an 23-gauge injection needle when extruded from the injection needle at 24° C. at a rate of 0.2 ml/second in the direction of 45° downward from a horizontal direction.

12. A photocured crosslinked-hyaluronic acid derivative solution produced by irradiating an aqueous solution of the photocurable hyaluronic acid derivative as defined in claim 4 with ultraviolet rays, wherein the photocured crosslinked-hyaluronic acid derivative solution having a concentration of 1.0% by weight is capable of forming a continuous thread having a length of not less than 3 cm which is formed without break from a tip open end of an 23-gauge injection needle when extruded from the injection needle at 24° C. at a rate of 0.2 ml/second in the direction of 45° downward from a horizontal direction.

13. A medical material comprising the photocurable hyaluronic acid derivative as defined in claim 1 or 4 and medically acceptable carrier.

14. A medical material comprising the photocured crosslinked-hyaluronic acid derivative as defined in claim 9 or 10 and medically acceptable carrier.

15. A medical material comprising the photocured crosslinked-hyaluronic acid derivative solution as defined in claim 11 and medically acceptable carrier.

16. A medical material comprising the photocured crosslinked-hyaluronic acid derivative solution as defined in claim 12 and medically acceptable carrier.

* * * * *